United States Patent [19]

Smethers, Jr.

[11] 3,854,679

[45] Dec. 17, 1974

[54] WATER-BASED AIRPLANE ESPECIALLY DESIGNED FOR ADAPTATION TO STOL

[75] Inventor: Rollo G. Smethers, Jr., Atlanta, Ga.

[73] Assignee: Lockheed Aircraft Corporation, Burbank, Calif.

[22] Filed: Jan. 7, 1974

[21] Appl. No.: 431,574

[52] U.S. Cl. .............................................. 244/106
[51] Int. Cl. .............................................. B64c 1/04
[58] Field of Search ........... 244/106, 105, 101, 119, 244/87, 91, 100 R

[56] References Cited
UNITED STATES PATENTS

| | | | |
|---|---|---|---|
| 1,314,227 | 8/1919 | Tolman | 244/106 |
| 1,930,922 | 10/1933 | Burnelli | 244/101 |
| 2,424,889 | 7/1947 | Holmes | 244/87 X |
| 2,623,720 | 12/1952 | Fortunato | 244/106 |
| 2,646,235 | 7/1953 | Dawson, Sr. | 244/105 |
| 3,627,235 | 12/1971 | Lippisch | 244/105 X |

Primary Examiner—Trygve M. Blix
Assistant Examiner—Paul E. Sauberer
Attorney, Agent, or Firm—Billy G. Corber; John J. Sullivan

[57] ABSTRACT

A water-based aircraft, either a flying boat or amphibian, features a catamaran hull blended with a wide fuselage. The resultant lateral stability in the water permits elimination of the traditional tip floats. Three engines, mounted two above the wing and one above the fuselage, minimize spray ingestion and engine-out directional stability problems both in the air and on the water. A V-tail is employed with the angle of attachment essentially bisecting the angularity between the wing and fuselage engines, thus avoiding jet engine efflux and effectively providing a high tail free of spray impingement. The V-tail is attached to twin boom fuselage extensions, which configuration also permits the spray ("rooster tail") thrown by the hulls to pass freely without impingement. Hydrofoils facilitate take-offs and landings.

6 Claims, 4 Drawing Figures

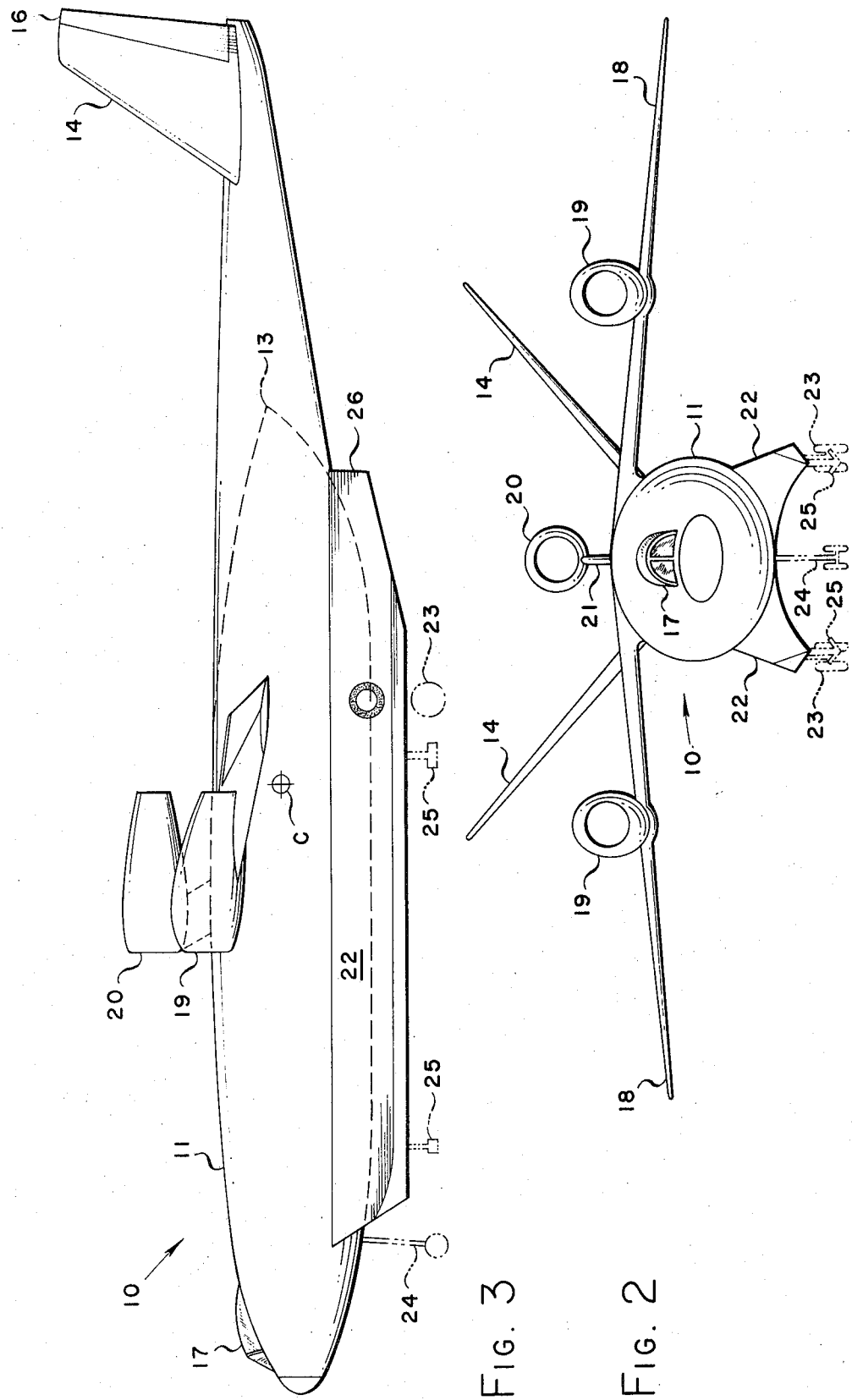

WATER-BASED AIRPLANE ESPECIALLY DESIGNED FOR ADAPTATION TO STOL

This invention relates to amphibious airplanes, or flying boats, generally, and more particularly to a multi-engine amphibious airplane especially designed for adaptation to high performance, short take off and landing (STOL) operation.

Aircraft operating from the water have traditionally been heavy and of more drag relative to conventional, land aircraft. The heaviness has resulted from the necessity to build additional strength into the aircraft to react landing loads unalleviated by shock absorption devices. Higher drag has resulted from the necessity to incorporate wing-tip floats or fuselage mounted sponsons to overcome the upsetting moment due to the fact that the center of gravity is above the metacentric height. The higher weights and drag, relatively low power available, and basic elements of seaplane design have resulted in general abandonment of watercraft in favor of landplanes for airline transport use.

The development of STOL aircraft as being potentially capable of restoring airline service operating from areas closer to the city center has excluded the seaplane exclusively. Yet, the fact exists that there is enough water available in the downtown area of virtually every major city to permit airline operations if a suitable STOL amphibian existed. The amphibian is suggested because it would provide boarding and unloading of passengers from dry land in the manner of a conventional airliner. Servicing and fueling would also be simpler.

The STOL amphibian should also possess inherent design features to minimize aerodynamic degradation in normal high speed flight. It should be of low drag, high power, and relatively light in weight while possessing the capability to operate from relatively short waterways.

The present invention contemplates a seaplane, preferably an amphibian, which is especially adaptable to STOL operation, being capable of high performance in both the landing/take off and the cruise modes. To this end, the airplane herein proposed is characterized by a fuselage that is generally elliptical in section with the longer dimension in the horizontal plane with respect to the line of level flight of the airplane. The underside of the fuselage is configured with a twin hull or catamaran to provide lateral stability while on the water. This overcomes the effect of the center of gravity of the airplane being above the metacenter which usually requires installation of wing-mounted, auxiliary floats, or alternatively, fuselage-mounted sponsons.

At its end the fuselage terminates in twin booms. The twin booms, blended into the aft extremity of the catamaran hulls, permit the so-called "rooster tail" emanating from the hulls to pass between the booms without impingement. Adjacent the extremity of each boom is an angularly outwardly disposed fin. These fins cooperate one with the other to constitute a V-tail. The disposition of this V-tail is such that each of its elements or fins lies outside the path of jet efflux from the several engines located upstream on the wing and/or fuselage as well as above the usual spray patterns emanating outwardly and aft from the hull.

With the above and other objects in view as will be apparent, this invention consists in the construction, combination, and arrangement of parts all as hereinafter more fully described, claimed and illustrated in the accompanying drawings wherein:

FIG. 2 is a front view of the same airplane to show primarily the elliptical fuselage and twin hull or catamaran on the underside thereof as well as the relative disposition of the several jet engines and fins which form the V-tail;

FIG. 3 is a side view of the same airplane; and

Figure 1:
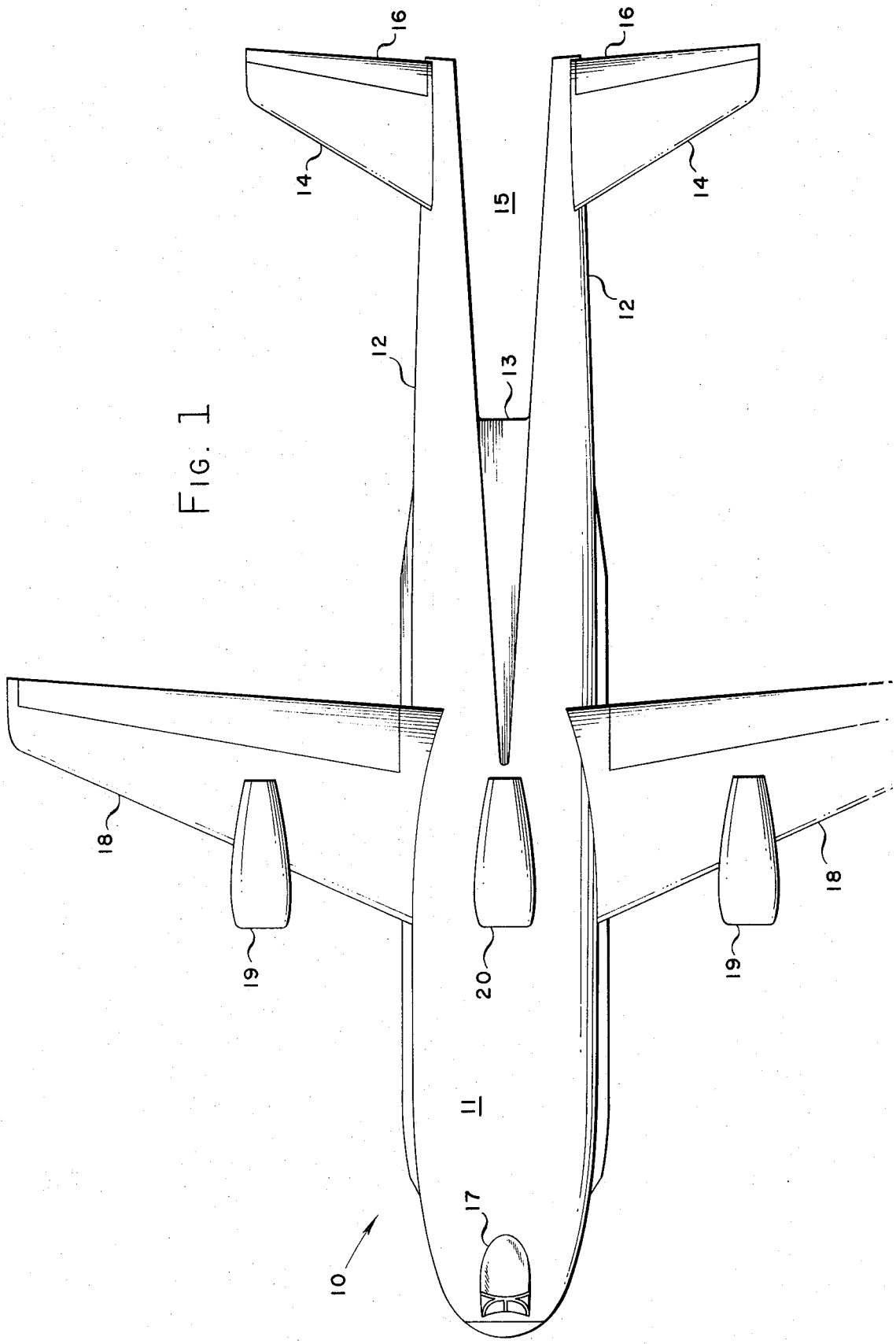
FIG. 1 is a plan view of a high performance multi-engine, amphibious airplane designed and constructed in accordance with the teachings of the present invention to show primarily the twin boom fuselage defining a water spray area adjacent the aft end thereof and the fins which form the V-tail.

Referring more particularly to the drawings, 10 designates an airplane having a fuselage II which is generally elliptical in cross-section (FIG. 2) and streamlined, i.e., airfoil-shaped in side profile (FIG. 3). The aft end of the fuselage II terminates in a split portion establishing twin booms 12. The airfoil shape extends from the nose aft to a point 13 where the twin booms 12 begin, the whole of which is aerodynamically faired to minimize drag. The airfoil shape is intended to provide a lifting fuselage effect.

Each twin boom 12 terminates in an angularly outwardly disposed fin 14 which achieves, in effect, a V-tail, which differs from a conventional V-tail in that it is laterally disposed a distance 15 between the booms 12. The purpose of the free area 15 between the end of the fuselage proper and the end of the twin booms 12 will become more apparent. The control surfaces 16 normally mounted on and associated with V-tails are provided in the trailing portions of each of the fins 14.

At its forward end the fuselage II incorporates a cabin or cockpit 17 covered in typical fashion by a transparent protruding, bubble-type canopy or closure. Aft of the cabin 17 is a pair of swept wings 18, one projecting from each side of the fuselage II adjacent the top thereof and on which is mounted an engine, preferably a turbofan engine 19, so as to provide over-the-wing jet efflux. A similar engine 20 is mounted on a stanchion 21 extending upwardly from the fuselage II so as to be in line laterally with the two wing-mounted engines 19. The discharge from each of these engines 19 and 20 is made to pass in an aft direction to one side of the tail fins 14.

At and along the underside of the fuselage II on each transverse side thereof is mounted a depending hull segment 22 with the two segments 22 cooperating one with the other to form a catamaran understructure for the airplane 10. Each hull segment 22 is generally triangular in section with the base thereof adjacent the fuselage II and the apex extending radially, outwardly from said fuselage II beyond the side thereof.

The main landing gear wheels 23 are mounted on each side of the fuselage II, one being accommodated by each hull segment 22 and being of the retractable type normally stored within a well or the equivalent in the hull segment 22 during flight of the airplane 10. A retractable nose gear 24 is mounted in conventional manner on the fuselage centerline adjacent the forward end of the fuselage II. Hydroskis or hydrofoils 25 may be provided in the undersurface of the fuselage II, and/or in the hull segments 22, to and from which they are retractable and extendable in conventional manner. At the aft terminal of the hull segments 22, a typical step 26 is formed.

The hydrofoils or hydroskis 25 are included since these devices function as load alleviation devices. As such they permit reduction in the weights normally required to react high loads due to landing impact.

The three-engined configuration results from consideration of spray effects emanating from the forward portion of the catamaran hulls 22. Since such spray is normally directed outward, upward, and aft, the placement of four engines would necessitate placing two of these on each wing with the most outward one in a position likely to be vulnerable to ingestion of spray. If two engines of sufficient power were utilized, the situation would accrue during an engine failure situation, as required by regulations, that the aircraft must be capable of continuing the take-off on the one remaining engine. Thus, the requirement for take-off with only 50 percent results in sizing the engines overly large. Resort to three engines as a solution only requires consideration of their placement. Locating the center engine at the rear of the fuselage would, in an amphibian or seaplane, result in locating the engine intake duct in a position of dense spray emanating from the aft portion of the hulls 22. Thus, the position establishing the center engine above the fuselage centerline results.

Figure 4:
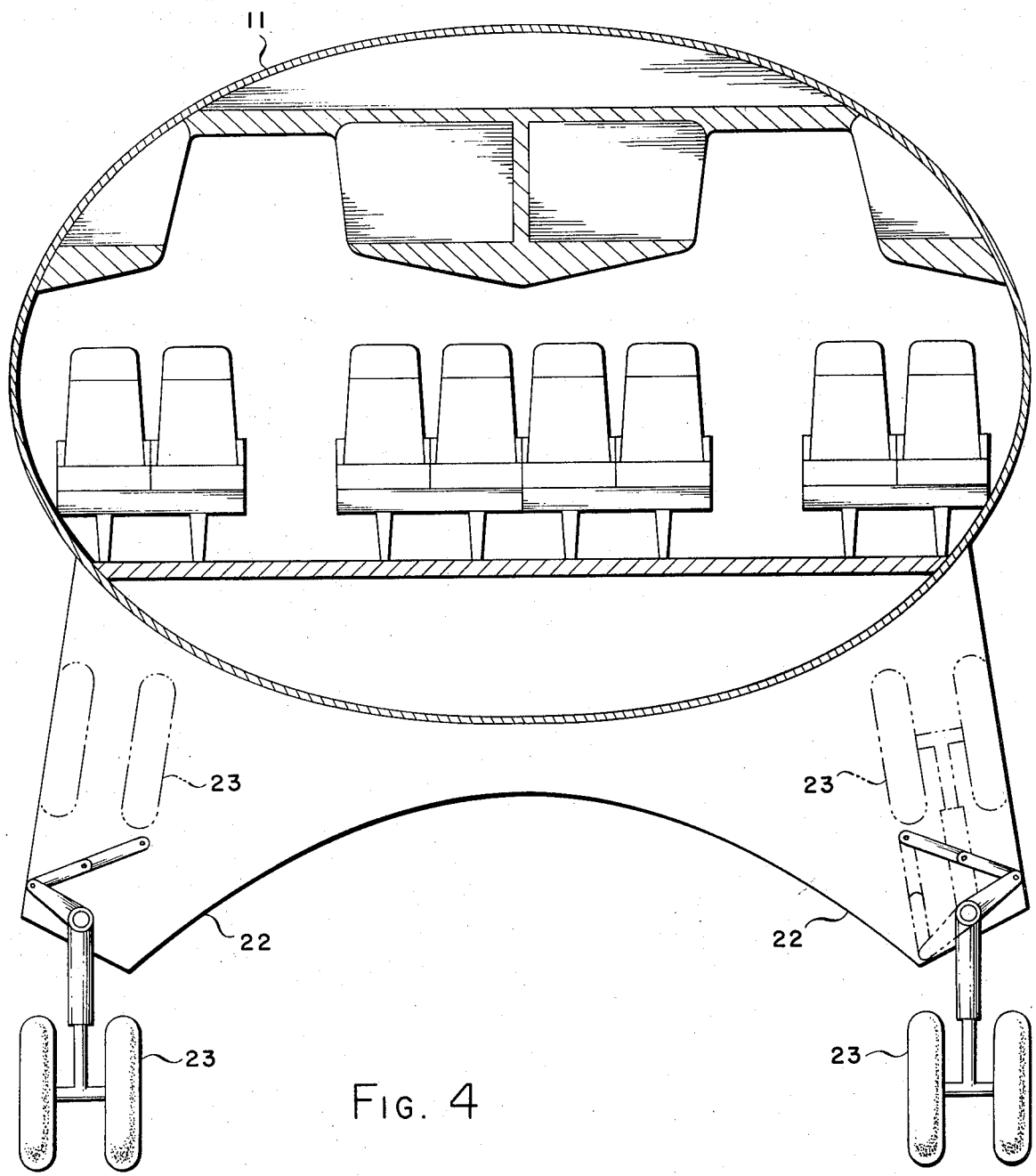
FIG. 4 is a cross-sectional view taken through the fuselage of the same airplane shown in FIGS. 1 through 3 to illustrate generally the fuselage twin hull and the interior, payload-carrying compartment.

The fuselage II being of elliptical shape in the transverse dimension provides wide spacing between the catamaran hulls 22 which at the same time permits achievement of the so-called wide body arrangement of passenger seating. This is illustrated generally in FIG. 4. The resulting configuration is a blending of the fuselage 10 and hulls 22 in a manner heretofore not employed.

The catamaran hulls 22 are of a shape in cross section, generally triangular which causes more water to be displaced as the hull is forced deeper into the water. Thus, even though the center of gravity C of the airplane 10 is above the metacenter, the upsetting moment resulting is naturally reacted by a restoring moment which becomes progressively larger as one or the other catamaran hull is forced deeper into the water. This arrangement obviates the need for traditional sponsons or wing floats.

STOL characteristics can, in general, be achieved, where desired, by the incorporation of high lift devices such as flaps, slats, and variable geometry wing devices already aboard many aircraft designs. The mounting of the engines above the wings, as herein proposed, serves as an additional means of improving the lift qualities of the design in that the jet efflux is made to flow over the upper portion of the wing. Moreover, the mounting of the several engines 19 and 20 over and above the wings 18 and fuselage II protects the inlets thereof against the ingestion of water on this high wing airplane 10.

Pursuant to the requirements of the patent statutes, the present invention has been shown and described in what is believed to be the most practical and preferred embodiment whereby it can be readily practiced by those skilled in the art to which it pertains. It is apparent that variations of the specific structures disclosed will suggest themselves to those skilled in the art and may be made without departing from the spirit and scope of the invention as fairly defined by the appended claims.

What is claimed is:

1. A multi-engine high performance airplane especially designed for adaptation to short take-off from and landing on water comprising an aerodynamically streamlined fuselage, a pair of spaced apart hulls extending along the underside of said fuselage, a pair of spaced apart booms extending from the aft end of said fuselage, each said boom terminating in an angularly disposed fin projecting outwardly therefrom whereby both booms constitute a V-tail for said airplane, a wing projecting from each side of said fuselage adjacent the top thereof, a jet engine mounted on top of each said wing and on said fuselage, the longitudinal dimension of such engines being substantially parallel one to the other and located so as to discharge exhaust in an aftward direction with the exhaust from each wing mounted engine passing on the remote sides of the tail fins aforesaid and the exhaust from the fuselage mounted engine passing between said fins.

2. The airplane of claim 1 wherein said fuselage is generally elliptical in cross section with the longer dimension in the horizontal plane with respect to the line of level flight of the aircraft.

3. The airplane of claim 1 wherein said hulls are each generally triangular in section with the base thereof adjacent the fuselage and the apex extending radially outwardly from said fuselage beyond the side thereof.

4. The airplane of claim 1 wherein said wings are swept back and all of said engines are disposed in lateral alignment.

5. The airplane of claim 1 including retractable landing gear wheels carried by said aircraft and extending below the hulls aforesaid.

6. The airplane of claim 1 including a plurality of hydroskis carried by said aircraft and adapted for extension and retraction to and from positions below the hulls aforesaid and internally of the aircraft.

* * * * *